United States Patent
Park (10) Patent No.: US 8,171,669 B1
(45) Date of Patent: May 8, 2012

(54) AIR ROOTING SHELL

(76) Inventor: Hong Ku Park, Huntsville, AL (US)

( * ) Notice: Subject to any disclaimer, the term of this patent is extended or adjusted under 35 U.S.C. 154(b) by 424 days.

(21) Appl. No.: 12/389,883

(22) Filed: Feb. 20, 2009

(51) Int. Cl.
*A01G 9/00* (2006.01)
(52) U.S. Cl. .......................................................... 47/32
(58) Field of Classification Search .................. 47/31.1, 47/32, 32.7, 32.8, 65, 66.1, 901; 119/57.8, 119/61.55
See application file for complete search history.

(56) References Cited

U.S. PATENT DOCUMENTS

| | | | |
|---|---|---|---|
| 2,021,793 A | 11/1935 | Lam | |
| 2,695,474 A * | 11/1954 | Barstow | 47/81 |
| 2,786,306 A | 3/1957 | Eaton et al. | |
| 2,939,248 A | 6/1960 | Beck | |
| 3,052,062 A | 9/1962 | Boyle | |
| 3,110,128 A | 11/1963 | Collins | |
| 3,755,965 A * | 9/1973 | Emery | 47/48.5 |
| 4,175,355 A | 11/1979 | Dedolph | |
| 4,216,622 A | 8/1980 | Hollenbach et al. | |
| 4,441,458 A * | 4/1984 | Mercil | 119/57.9 |
| 4,955,156 A * | 9/1990 | Williams | 47/32.7 |
| 5,029,373 A * | 7/1991 | Raymond | 27/1 |
| 5,379,499 A * | 1/1995 | Jackson | 27/1 |
| 5,507,249 A * | 4/1996 | Shaw | 119/72 |
| 7,428,798 B2 * | 9/2008 | Abney, II | 47/73 |
| 2002/0100210 A1 * | 8/2002 | Vahrmeyer | 47/65.5 |
| 2003/0213170 A1 * | 11/2003 | Snead et al. | 47/62 A |
| 2010/0218421 A1 * | 9/2010 | Monnes | 47/29.5 |

FOREIGN PATENT DOCUMENTS

GB 2108813 A * 5/1983

OTHER PUBLICATIONS

"Air Layering", NZ Gardens Online Feature Article, found at http://gardens.co.nz/Articles.cfm?NLID=124, printed on Nov. 14, 2008, 2 pages.
Charlie Nardozzi, "A Simpler Way to Make New Plants", The National Gardening Association Gardening Article, found at http://www.garden.org/subchannels/landscaping/trees?q=show&id=2628, printed on Nov. 14, 2008, 1 page.
"Rooter Pot", found at http://bonsaiofbrooklyn.com/products/supplies/a12.html, printed on Nov. 14, 2008, 1 page.

* cited by examiner

*Primary Examiner* — Rob Swiatek
*Assistant Examiner* — Ebony Evans
(74) *Attorney, Agent, or Firm* — Angela Holt; Bradley Arant Boult Cummings LLP (57) ABSTRACT

An air rooting shell comprises a first shell half mateable with a second shell half to form a shell for enclosing around a branch. The shell comprises a reservoir for containing planting medium and an upper lipped opening that receives the branch and collects and funnels water to the reservoir. A bottom opening is provided through which the lower portion of the branch may exit. Side openings on the shell may be used to enclose a branch in a horizontal orientation, while the upper lipped opening remains vertically oriented to receive water.

11 Claims, 9 Drawing Sheets

Fig. 6
(Section A-A)

Fig. 9
(Detail B)

AIR ROOTING SHELL

BACKGROUND

The present invention relates generally to an apparatus for rooting plants using an air layering method, and more particularly to an air rooting shell for enclosing a branch and encouraging the growth of new roots.

Air layering is a method of propagating plants in which roots are encouraged to grow on a branch of a plant in order to create a new plant. The method involves cutting an inch or two of the outermost layer of bark from around a branch, putting root grow medium on the cut branch, surrounding the cut portion with a moist rooting or planting medium, and enclosing the branch and planting medium. If the planting medium is kept moist, within from about six weeks to a few months roots should begin to form on the branch. The branch can then be planted to create a new plant.

SUMMARY

An apparatus according to an embodiment of the present disclosure comprises a first shell half mateable with a second shell half to form a shell for enclosing around a branch. The shell comprises a reservoir for containing planting medium and an upper lipped opening that receives the branch and collects and funnels water to the reservoir. A bottom opening is provided through which the lower portion of the branch may exit. Side openings on the shell may be used to enclose a branch in a horizontal orientation, while the upper lipped opening remains vertically oriented to receive water.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

These and other embodiments of the present invention will also become readily apparent to those skilled in the art from the following detailed description of the embodiments having reference to the attached figures, the invention not being limited to any particular embodiment(s) disclosed.

Repeat use of reference characters throughout the present specification and appended drawings is intended to represent the same or analogous features or elements of the invention.

DETAILED DESCRIPTION

Figure 1:
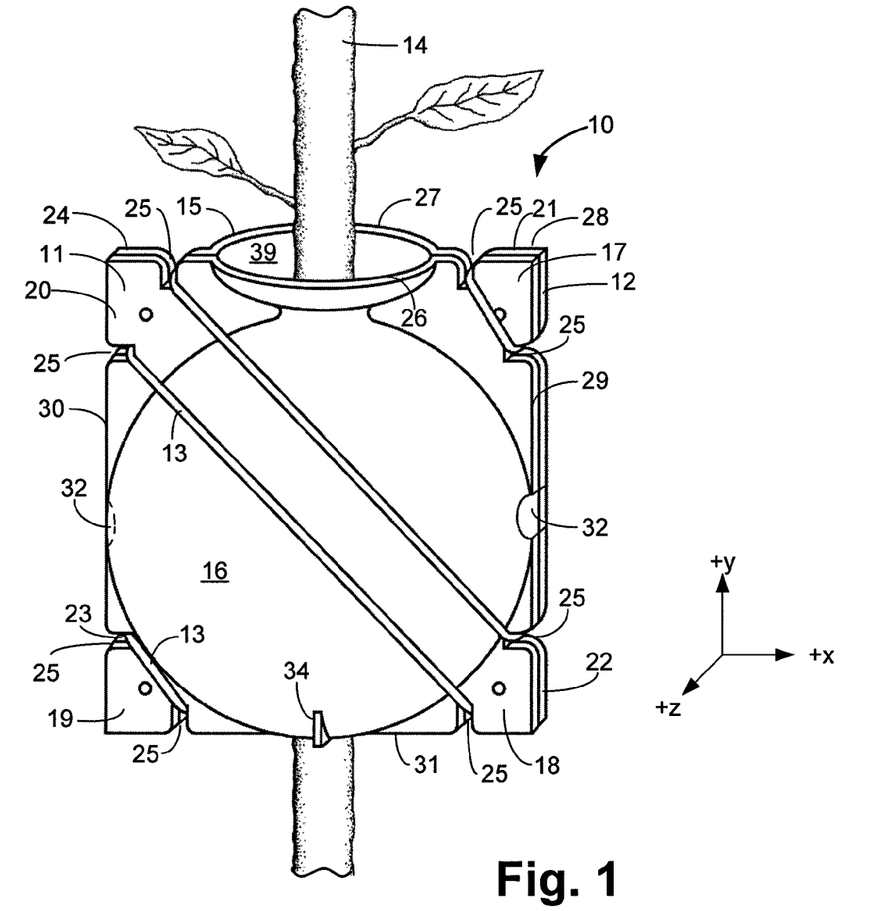
FIG. 1 is a perspective view of an air rooting shell according to an embodiment of the present disclosure.

FIG. 1 depicts an exemplary embodiment of an air rooting shell 10 enclosing a branch 14. The air rooting shell 10 comprises a first shell half 11 and a second shell half 12 joined together around a branch 14 by one or more fasteners 13. The first shell half 11 and the second shell half 12 are substantially similar in this embodiment; therefore, the description herein of the first shell half 11 also applies to the second shell. When joined together, the first shell half 11 and the second shell half 12 are mirror images of each other. The first shell half 11 and the second shell half 12 may differ in other embodiments of the present disclosure.

The first shell half 11 and the second shell half 12 may be constructed from thin molded plastic or other suitable materials, such as composite, resin, metal, and the like. In one embodiment, the wall thickness of the first shell half 11 and the second shell half 12 is 1 millimeter. Other wall thicknesses may be used. Further, the material used to construct the first shell half 11 and the second shell half 12 may be transparent, such that the rooting medium (not shown) may be seen through the air rooting shell 10, or may be opaque.

The first shell half 11 comprises a convexly-shaped curved outer shell 16. In this embodiment, the convexly-shaped curved outer shell 16 is shaped generally as a half sphere, though in other embodiments differently shaped outer shells may be used, such as oval, oblong, square, or polygonal. When the first shell half 11 is joined with the second shell half 12, the curved outer shell 16 of the first shell half 11 and the curved outer shell 16 of the second shell half 12 form a generally spherical hollow reservoir (not shown) for containing the branch 14 and the rooting medium (not shown), as further discussed herein. In one embodiment, the diameter of the generally spherical hollow reservoir is generally four (4) inches, though other dimensions are used in other embodiments.

The curved outer shell 16 is integral with and/or joined to corner flanges 17-20. In the illustrated embodiment, the corner flanges 17-20 are flat planar flanges located at the four corners of the first shell half 11. The corner flanges 17-20 are located in the same plane as one another, namely, the x-y plane. The corner flanges 17-20 contact mirror-imaged corner flanges 21-24 on the second shell half 12 as illustrated in FIG. 1.

A lip 15 is formed in a top edge 28 of the air rooting shell 10 by curved edges 26 and 27 formed in the first and second hell halves 11 and 12, respectively. The lip 15 directs water into the generally spherical hollow reservoir of the air rooting shell 10. In the illustrated embodiment, the curved edges 26 and 27 are semi-circular in shape, forming a round lip 15 when the first shell half 11 is joined with the second shell half 12. The curved edges 26 and 27 may be differently-shaped in other embodiments. Further, a tapered inner wall 39 formed by the curved edges 26 and 27 is concave and gently tapers to an opening (not shown) in which the branch 14 enters the generally spherical hollow reservoir.

Side edges 29 and 30 are disposed on the right and left sides, respectively, of the first shell half 11. The side edges 29 and 30 are generally straight and are oriented generally in the +/−y direction when the air rooting shell 10 is installed around a branch 14 that is generally oriented in the +y direction, as shown. Each side edge 29 and 30 comprises a side knock-out tab 32 disposed generally mid-way down the side edges 29 and 30, as further discussed with reference to FIG. 7 herein.

A bottom side edge 31 is a generally straight edge disposed at the bottom of the first shell half 11. A bottom opening 33 (FIG. 2) is disposed on the bottom side edge 31 and permits a the branch 14 to pass through the bottom side edge 31 of the first shell half 11 and the second shell half 12.

In the illustrated embodiment, a pedestal 34 is disposed on the bottom side edge 31. The pedestal 34 is a generally triangular protrusion that may be used to support the shell 10 when the shell 10 is used in a "standing" orientation, i.e., is not attached to the branch 14 that passes through the shell 10, but rather stands on a surface, as further discussed herein. Other embodiments may not include a pedestal 34, or may include a differently sized or shaped pedestal 34.

The corner flanges 17-20 and 21-24 comprise a plurality of grooves 25 for receiving the fasteners 13 that join the first shell half 11 to the second shell half 12. In the illustrated embodiment, the fasteners 13 are elastic (e.g., rubber) bands, though other types of fasteners may be used in other embodiments. The fasteners 13 loop through the grooves 25 and hold the first shell half 11 to the second shell half 12.

Figure 2:
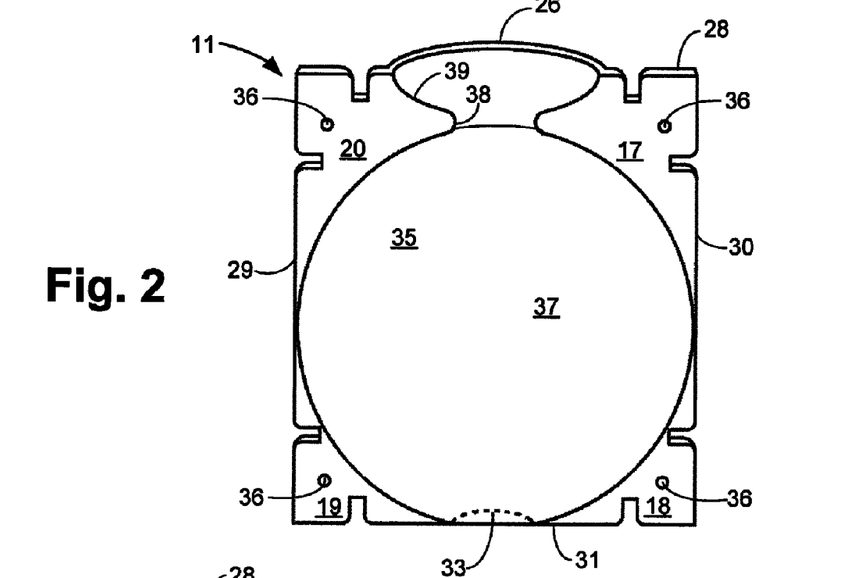
FIG. 2 is an inside perspective view of an exemplary half of the air rooting shell.

FIG. 2 is an inside perspective view of the embodiment of the first shell half 11 shown in FIG. 1, when the shell half 11 is not coupled to the shell half 12 (FIG. 1). A concave inside surface 35 of the curved outer shell 16 (FIG. 1) forms a reservoir 37 for containing a branch (not shown) and rooting medium (not shown). The curved edge 26 has a tapered inner wall 39 that forms a funnel shape with a neck opening 38. When the first shell half 11 is joined with the second shell half 12 (FIG. 1) such that the curved edge 26 abuts curved edge 27 to form the lip 15, water (not shown) may be funneled into the lip 15, through the neck opening 38, and into the reservoir 37.

In one embodiment, four (4) support holes 36 are disposed in the corner flanges 17-20 as shown. The support holes 36 may be used to attach the air rooting shell 10 (FIG. 1) to one or more supports (not shown) for supporting the air rooting shell 10, as further discussed herein.

Figure 8:
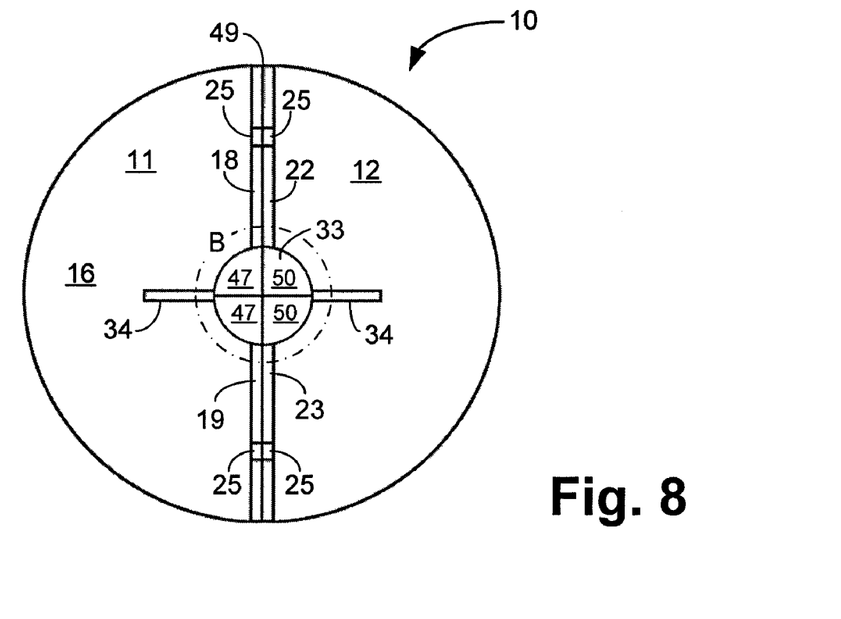
FIG. 8 is a bottom plan view of the air rooting shell of FIG. 1.

The first half shell 11 comprises a generally semi-circular opening 33. When the first shell half 11 is mated to the second shell half 12, the semi-circular opening 33 joins with a semi-circular opening (not shown) of shell half 12 to form a generally circular opening (FIG. 8). The branch 14 (FIG. 1) then extends through the formed opening.

Figure 3:
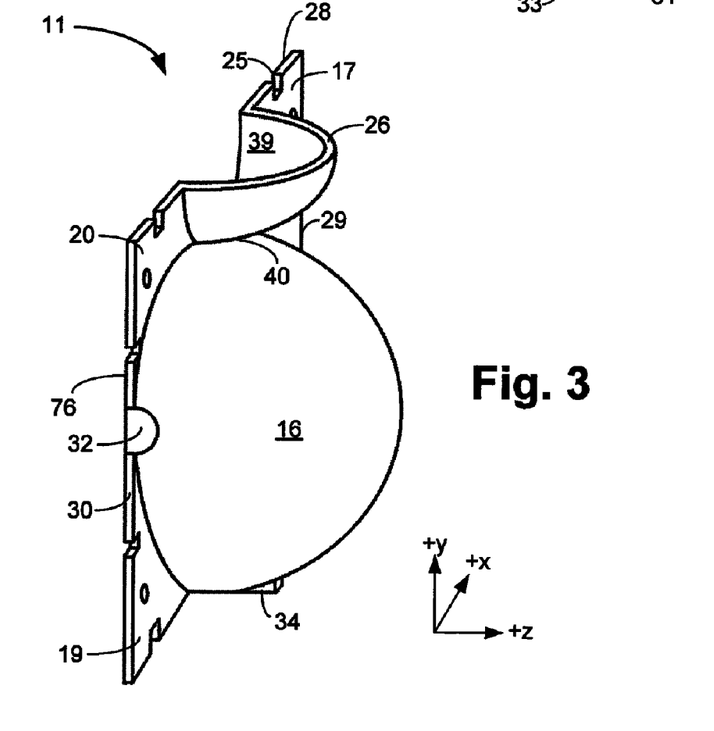
FIG. 3 is a front/side perspective view of the shell half of FIG. 2.

FIG. 3 further depicts the first shell half 11 of the air rooting shell 10 (FIG. 1). The curved outer shell 16 and the curved edge 26 protrude from the flat corner flanges 17, 19, 20, and 18 (FIG. 2) as shown. The curved edge 26 tapers down to a narrowed neck 40. The four corner flanges 17-20 are formed in the same plane, i.e., the x-y plane. A rear edge 76 of the first shell half 11 is generally flat, so that the first shell half 11 contacts the second shell half 12 (FIG. 1) along a generally flat mating surface (not shown).

Figure 4:
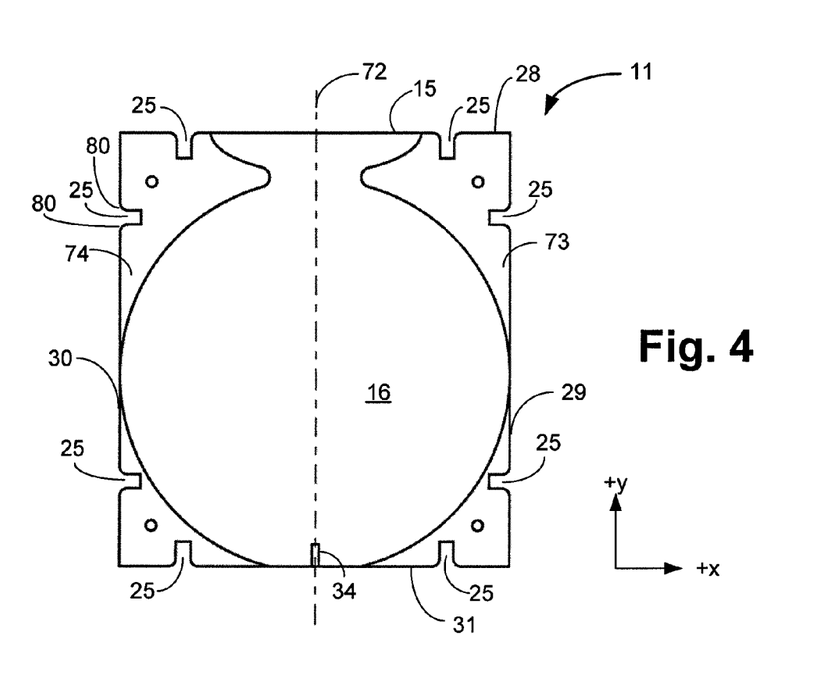
FIG. 4 is a front plan view of the shell half of FIG. 2.

FIG. 4 is a front plan view of the first shell half 11 of the air rooting shell 10 (FIG. 1). In this embodiment, the top edge 28 is generally straight, except for the grooves 25 disposed along the top edge 28. Note that while the lip 15 extends in the +z direction (FIG. 3), the lip 15 thus does not extend above the top side edge 28 in the +y direction in this embodiment. The top edge 28, bottom side edge 31, and the side edges 29 and 30 form a generally rectangular shape, with the exception of the grooves 25 that recess into the edges 28-31. The grooves 25 have rounded outer corners 80, which permits easier installation and removal of the fasteners 13 (FIG. 1).

In the illustrated embodiment, a right side half 73 of the first shell half 11 is symmetrical around a central vertical axis 72 with a left side half 74 of the first shell half 11.

Figure 5:
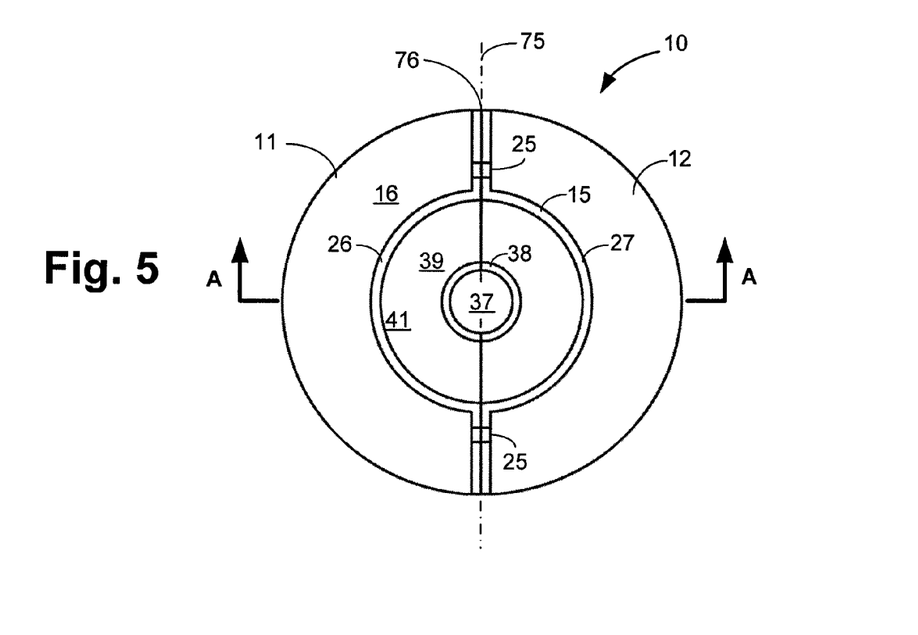
FIG. 5 is a top plan view of the air rooting shell of FIG. 1.

FIG. 5 is a top view of the embodiment of the air rooting shell 10 of FIG. 1 with the first shell half 11 joined to the second shell half 12. The lip 15 is formed by the curved edges 26 and 27, and has a top opening 41 that is flared for receiving water (not shown). The tapered inner wall 39 funnels down to the neck opening 38 which opens into the reservoir 37. In the illustrated embodiment, the lip 15 and the neck opening 38 are circular in shape. In other embodiments, different shapes may be employed for the lip 15 and the neck opening 38, such as oval, polygonal, and multi-faceted.

In this embodiment, the first shell half 11 is a mirror image of the second shell half 12, and the two shell halves 11 and 12 are thus symmetrical about a centerline 75 aligned with the rear edge 76 of the first shell half 11.

Figure 6:
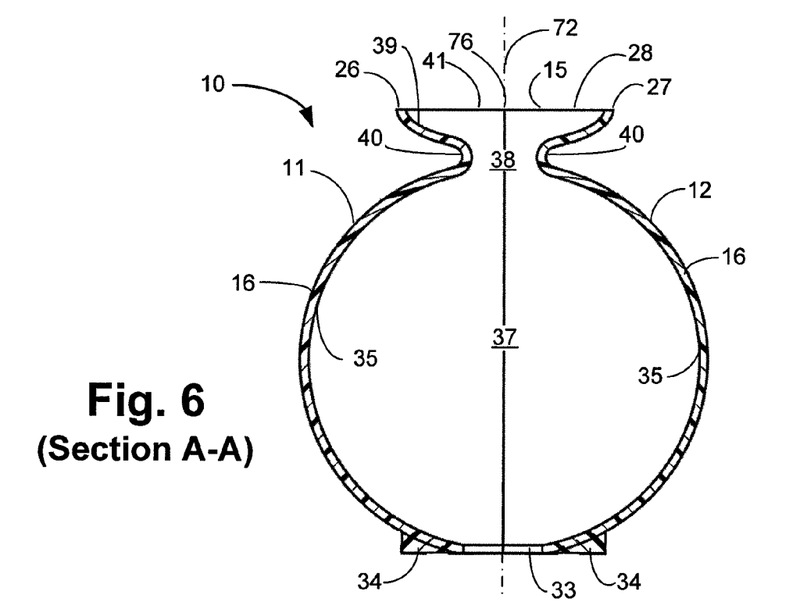
FIG. 6 is a cross-sectional plan view of the air rooting shell of FIG. 1, taken along section lines A-A of FIG. 5.

FIG. 6 is a cross-sectional view of the air rooting shell 10 of FIG. 4 taken along section lines "A-A" of FIG. 5. The inner walls 35 of the shell halves 11 and 12 when joined form the generally spherical reservoir 37. When the air rooting shell 10 is in use, water (not shown) that enters the top opening 41 will be funneled along the inner wall 39 of the lip 15 and will pass through the neck opening 38 and into the reservoir 37.

The neck opening 38 is sufficiently large such that the branch 14 (FIG. 1) may be disposed within it. The branch 14 is roughly cylindrical in shape and may pass longitudinally through the air rooting shell 10 (i.e., generally parallel to the center axis 72) and be enclosed within the neck opening 38. Likewise, the bottom opening 33 is sufficiently large that the branch 14 (FIG. 1) may be passed through it. The bottom opening 33 is generally aligned with the neck opening 38.

Figure 7:
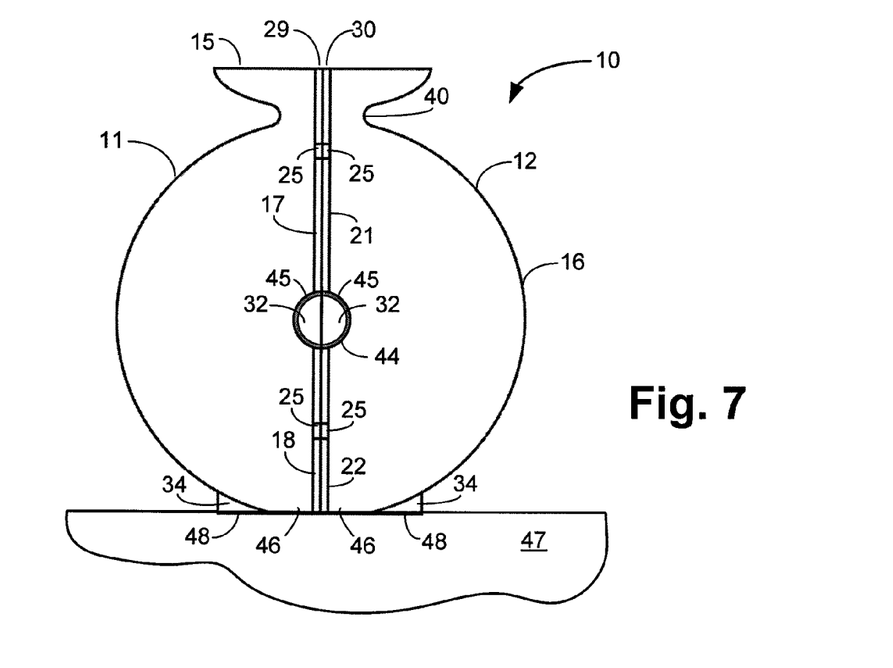
FIG. 7 is a side plan view of the air rooting shell of FIG. 1.

FIG. 7 is a side plan view of the air rooting shell 10 with the first shell half 11 and the second shell half 12 joined together. When the first shell half 11 is joined with the second shell half 12, the corner flange 17 of the first shell half 11 contacts the corner flange 21 of the second shell half 12, and the corner flange 18 of the first shell half 11 contacts the corner flange 22 of the second shell half 12. Likewise, although not shown in FIG. 7, the corner flange 19 (FIG. 1) of the first shell half 11 contacts the corner flange 23 (FIG. 1) of the second shell half 12 and the corner flange 20 (FIG. 1) of the first shell half 11 contacts the corner flange 24 (FIG. 1) of the second shell half 12. With the corners 17-20 of the first shell half 11 contacting and aligned with the corners 21-24 of the second shell half 12, the grooves 25 are aligned such that fasteners 13 (FIG. 1) may be installed to restrain the first and second shell halves 11 and 12 together, as further discussed herein.

In the illustrated embodiment, pedestals 34 are located on a lower surface 46 of each shell half 11 and 12. Each pedestal protrudes from the outer shell 16 and has a generally flat lower surface 48 that is generally parallel to and in the same plane as the bottom side edge 31 (FIG. 1).

The pedestals 34 support the air rooting shell 10 when the air rooting shell 10 is set upon a generally flat surface 47. The air rooting shell 10 may thus be used to root a plant cutting (not shown) that is placed within the air rooting shell 10 but that does not pass through the air rooting shell 10. The pedestals 34 stabilize the shell 10 and permit it to maintain a generally vertical orientation, i.e., with the lip 15 facing up.

In other embodiments, the shell halves 11 and 12 may have sufficiently flat lower surfaces 46 such that the air rooting shell 10 may be maintained in a vertical orientation without the need for pedestals 34 or other similar features.

In this embodiment, the side knock-out tabs 32 on the two halves 11 and 12 are semi-circular in shape with an outer groove 45 that permits the side knock-out tabs 32 to be "knocked out." The outer groove 45 comprises a groove and/or perforations cut into the shell halves 11 and 12. When the side knock-out tabs 32 are removed, a generally circular opening (not shown) is formed in the sides of the air rooting shell 10. The opening is located mid-way down the spherical portion of the air rooting shell 10, i.e., approximately 90 degrees from the lip 15.

Figure 12:
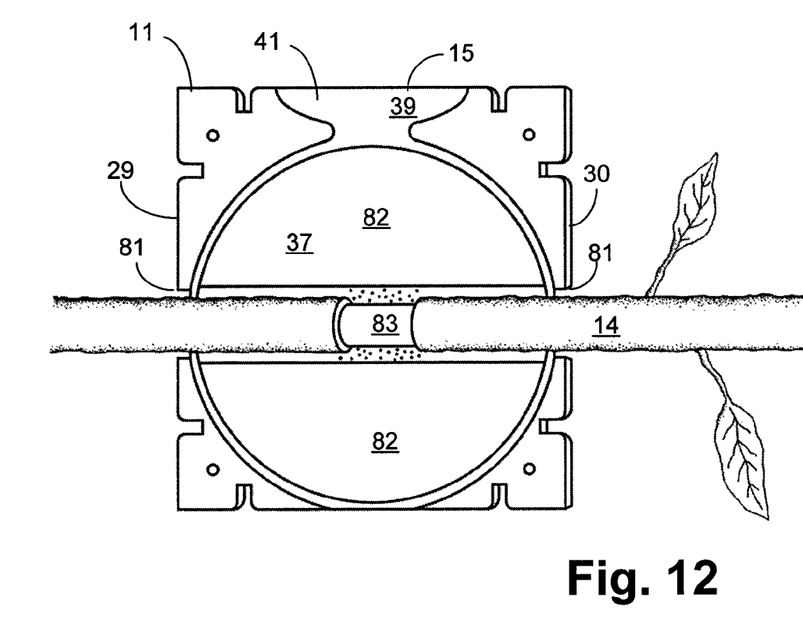
FIG. 12 is an inside plan view of an exemplary shell half of the air rooting shell of FIG. 1 in which the shell half has been installed on a generally horizontal branch.

A branch 14 (FIG. 1) may be passed through the opening (not shown) created by removing the side knock-out tabs 32 in the event the air rooting shell 10 is installed around a horizontally-oriented branch 14, as further discussed herein with reference to FIG. 12. In the illustrated embodiment, knock-out tabs 32 are used to create side openings (not shown) in the air rooting shell 10. Other configurations of side knock-out tabs may be used in other embodiments. Further, the air rooting shell 10 may be provided without any side knock-out tabs 43.

FIG. 8 is a bottom plan view of the air rooting shell 10 according to one embodiment of the disclosure. As was discussed above with respect to FIG. 7, when the first shell half 11 is joined with the second shell half, the corner flange 18 of the first shell half 11 and the corner flange 22 of the second shell half 12 contact one another. Similarly, the corner flange 19 of the first shell half 11 contacts the corner flange 23 of the second shell half 12. The grooves 25 are then aligned such that fasteners 13 (FIG. 1) may be installed to restrain the first shell half 11 in contact with the second shell half 12.

In this embodiment, the pedestals 34 on the first and second shell halves 11 and 12 are disposed at generally right angles to a seam 49 between the first shell half 11 and the second shell half 12. The pedestals 34 each comprise narrow rectangular-shaped protrusions (when viewed from the bottom, as in FIG. 8). In other embodiments, other types of pedestals may be employed to stabilize the air rooting shell 10 when it is set upon a surface.

The bottom opening 33 is disposed at the bottom center of the air rooting shell 10 in the illustrated embodiment. The bottom opening 33 is formed by two petals 47 on the first shell half 11 and two petals 50 on the second shell half 12. In this embodiment, the petals 47 and 50 are flexible such that they may flex outward when the air rooting shell 10 is enclosed around a branch 14 (FIG. 1).

Figure 9:
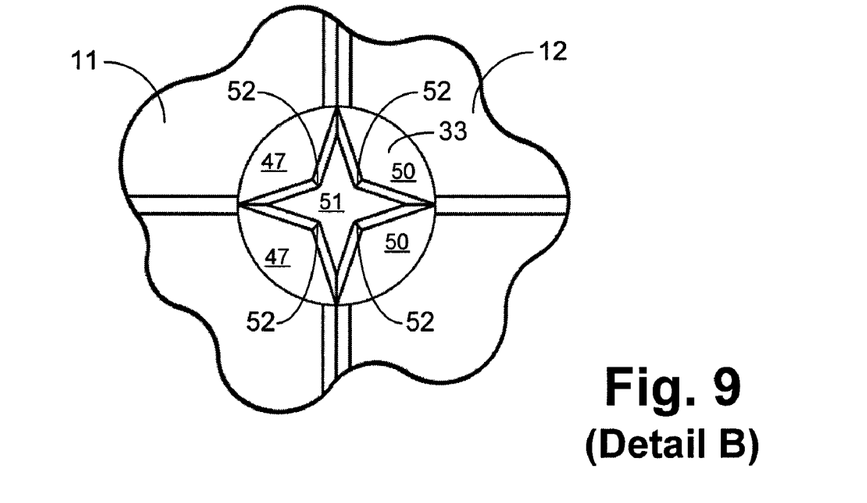
FIG. 9 is an enlarged bottom plan view showing an opening of the shell of FIG. 8, taken along Detail "B" of FIG. 8.

FIG. 9 is a detail view of the bottom opening 33 of FIG. 8, taken along Detail "B." The flexing of the petals 47 and 50 as described above is shown, as the petals 47 and 50 are flexed outward in this view to form an aperture 51 for receiving the branch 14 (FIG. 1). In operation of the air rooting shell 10 of FIG. 1, the branch 14 (FIG. 1) is generally still connected to a tree or plant when the air rooting shell 10 is installed around the branch 14. Therefore, the branch is not "pushed through" the bottom opening 33, but rather the branch is enclosed by the two shell halves 11 and 12 and enclosing the branch 14 will cause the petals 47 and 50 to flex and receive the branch 14.

The petals 47 and 50 comprise tips 52 which may remain in contact with the branch 14 (FIG. 1) when the branch 14 is enclosed within the air rooting shell 10. This contact helps to prevent the air rooting shell 10 from slipping on the branch 14.

Although four (4) petals are shown in FIG. 9 (two petals 47 on shell half 11 and two petals 50 on shell half 12), there may be more or fewer petals comprising the bottom opening 33 in other embodiments. Further, other embodiments may use other configurations for the bottom opening 33, such as a knock-out opening (not shown) as described with respect to the side knock-out tabs 32 discussed with respect to FIG. 7 above.

Figure 10:
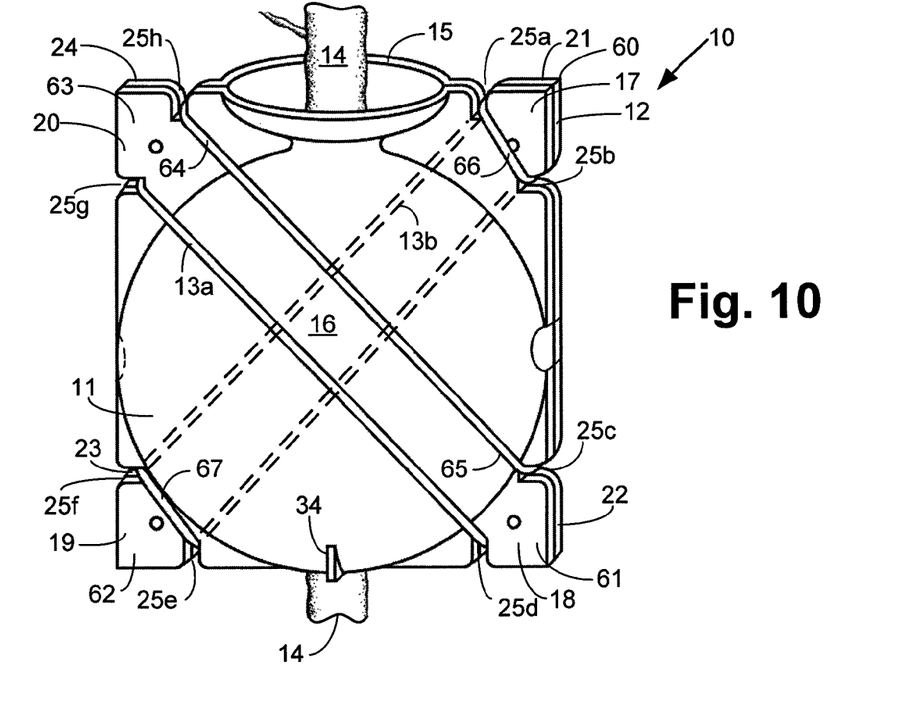
FIG. 10 is a front perspective view of the air rooting shell of FIG. 1 held together with rubber band-type fasteners.

FIG. 10 depicts the air rooting shell 10 with two rubber band-type fasteners 13a and 13b installed to hold the shell halves 11 and 12 together. In order to install the air rooting shell 10 around the branch 14, a user (not shown) installs the first shell half 11 and the second shell half 12 around the branch 14 such that the shell halves 11 and 12 are aligned and the branch 14 passes through the lip 15 and the bottom opening 33. When the shell halves 11 and 12 are properly aligned, the corner flange 17 of the first shell half 11 will contact and be aligned with the corner flange 21 of the shell half 12, forming a joined corner 60. Further, the corner flange 18 of the first shell half 11 will contact and be aligned with the corner flange 22 of the shell half 12, forming a joined corner 61. The corner flange 19 of the first shell half 11 will contact and be aligned with the corner flange 23 of the shell half 12, forming a joined corner 62. The corner flange 20 of the first shell half 11 will contact and be aligned with the corner flange 24 of the shell half 12, forming a joined corner 63.

The user may install the fastener 13a by looping an upper end 64 of the fastener 13a over a joined corner 63, such that the upper end 64 is received by grooves 25g and 25h and the fastener 13a extends diagonally across the first shell half 11, as illustrated in FIG. 10. The user may then loop a lower end 65 of the fastener 13a over the joined corner 61, such that the lower end 65 is received by grooves 25c and 25d. The fastener 13a will at this point hold the two shell halves 11 and 12 together around the branch 14.

The fastener 13b may be installed similarly to further secure the two shell halves 11 and 12 together. The user may by looping an upper end 66 of the fastener 13b over the joined corner 60, such that the upper end 66 is received by grooves 25a and 25b and the fastener 13a extends diagonally across the second shell half 12, as illustrated. The user may then loop a lower end 67 of the fastener 13b over the joined corner 62, such that the lower end 67 is received by grooves 25e and 25f.

Figure 11:
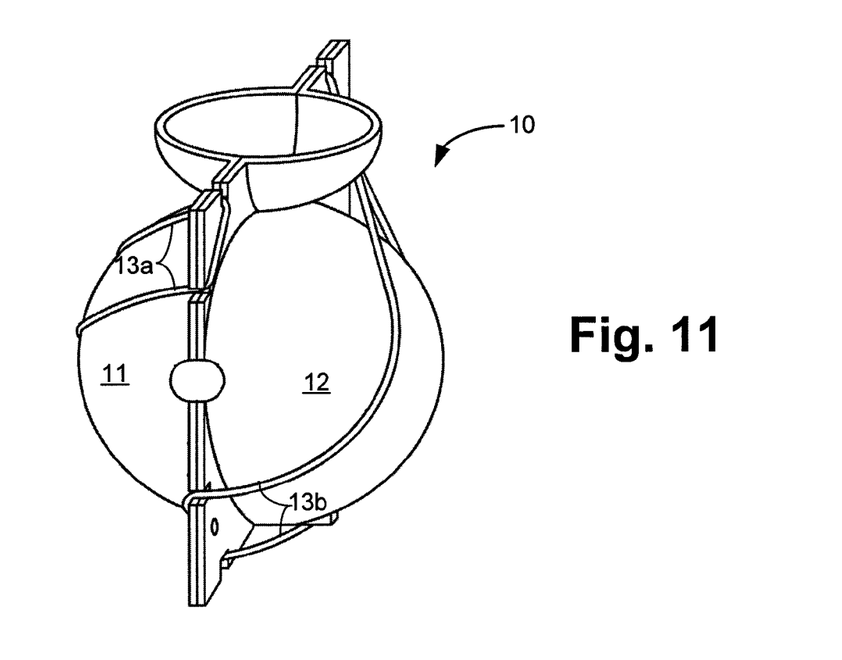
FIG. 11 is a side perspective view of the air rooting shell of FIG. 1 held together with rubber band-type fasteners.

FIG. 10 illustrates rubber band-type fasteners 13a and 13b which hold the shell halves 11 and 12 together elastically. Other types of fasteners may alternatively be used, such as friction-type clips, screws, wires, or ties FIG. 11 further depicts the fasteners 13a and 13b installed on the air rooting shell 10 to hold the shell halves 11 and 12 together.

FIG. 12 is an inside view of the first shell half 11 installed on the branch 14 when the branch 14 is installed through side openings 81. This configuration of the air rooting shell 10 may be desired when the branch 14 is in a generally horizontal or angled orientation (as opposed to being generally vertical). The side openings 81 have been created in the side edges 29 and 30 of the first shell half 11 by removing the knock-out tabs 32 (FIG. 7). The branch 14 is disposed within the side openings 81 with a scored portion 83 located generally centrally within the reservoir 37. With this configuration, the lip 15 may collect water (not shown) and provide it to the branch 14 even though the branch 14 is in a generally horizontal orientation.

In the illustrated embodiment, rooting medium 82 surrounds the branch 14. Root grow formula 84 has been placed around the scored portion 83 the branch 14 to promote the growth of roots (not shown) from the branch 14.

Figure 13:
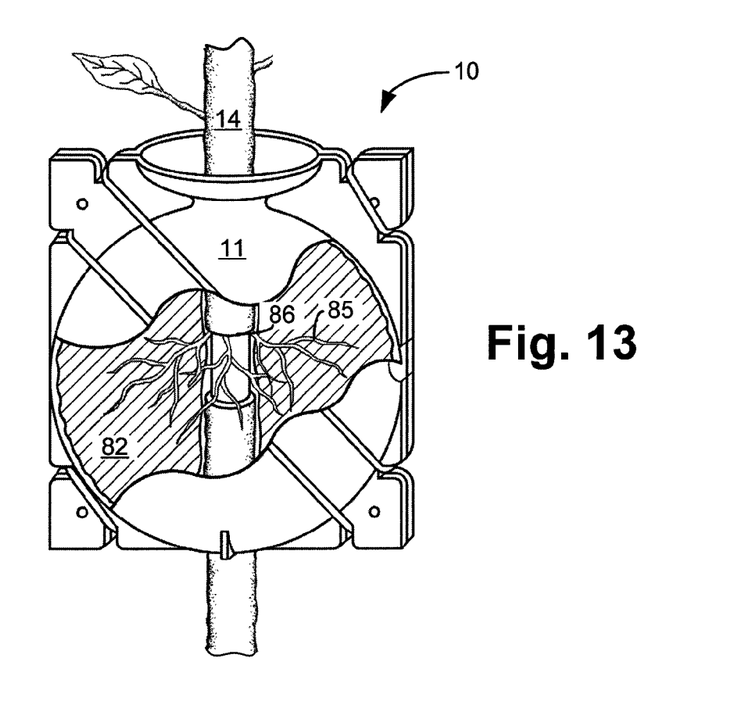
FIG. 13 is a front perspective view of the air rooting shell of FIG. 1 with a portion the air rooting shell removed to show roots emerging from a branch.

FIG. 13 depicts the air rooting shell 10 in which a portion of the first shell half 11 has been removed to show a sprouting branch 14 contained within the air rooting shell 10. Roots 85 have begun to form along the top edge 86 of the scored portion 83 of the branch 14.

Figure 14:
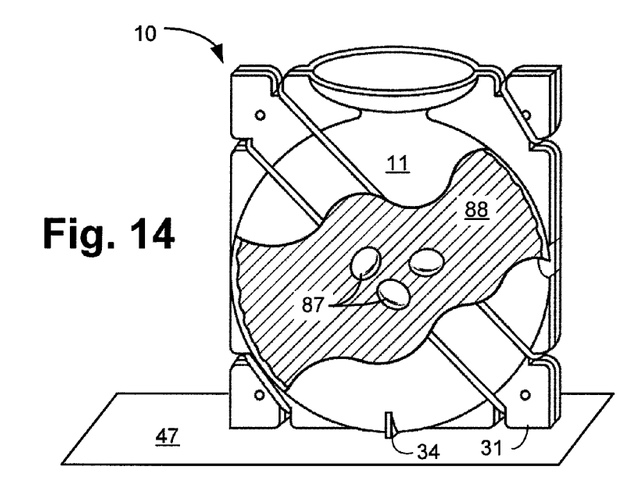
FIG. 14 is a front perspective view of the air rooting shell of FIG. 1 with a portion of the air rooting shell removed to show seeds planted within the shell.

FIG. 14 depicts an air rooting shell 10 in which a portion of the first shell half 11 has been removed to show seeds 87 that have been planted within the air rooting shell 10. In this embodiment, the shell 10 is placed upon a surface 47 such that the bottom side edge 31 and the pedestals 34 (only one shown in FIG. 14) support the shell 10 such that its lip 15 is upright for receiving moisture or water. The seeds 87 have been planted in a planting medium 88. In this embodiment, the shell 10 may be thus used in the manner of a traditional plant pot.

Figure 15:
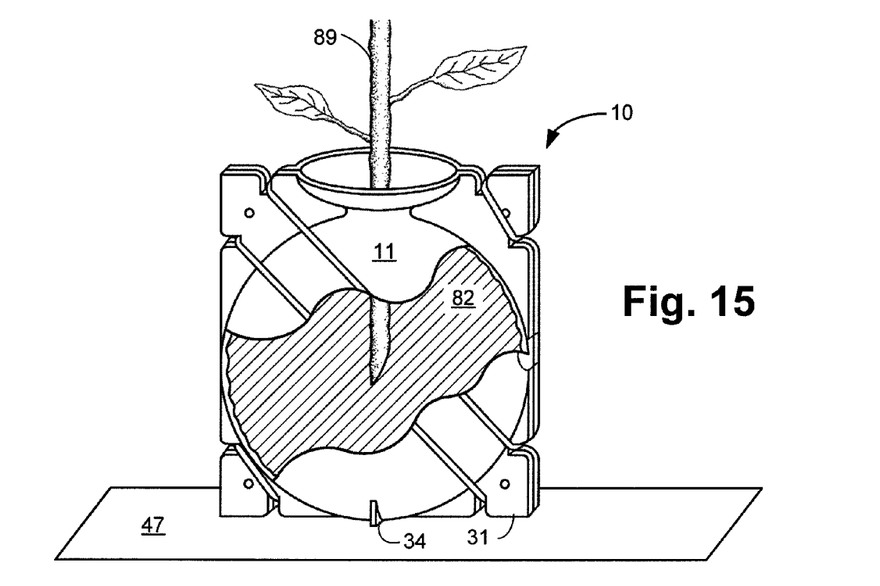
FIG. 15 is a front perspective view of the air rooting shell of FIG. 1 with a portion of the first air rooting shell removed to show a cut branch disposed within the shell.

FIG. 15 depicts an air rooting shell 10 in which a portion of the first shell half 11 has been removed to show a cut branch 89 (i.e., a branch that is no longer growing from the ground (not shown)) disposed within the air rooting shell 10. In this embodiment, the shell 10 is placed upon a surface 47 such that the bottom side edge 31 and the pedestals 34 (only one shown in FIG. 14) support the shell 10 in a generally vertical orientation. The shell 10 is thus usable to root cut branches in addition to rooting using an air layering method.

Figure 16:
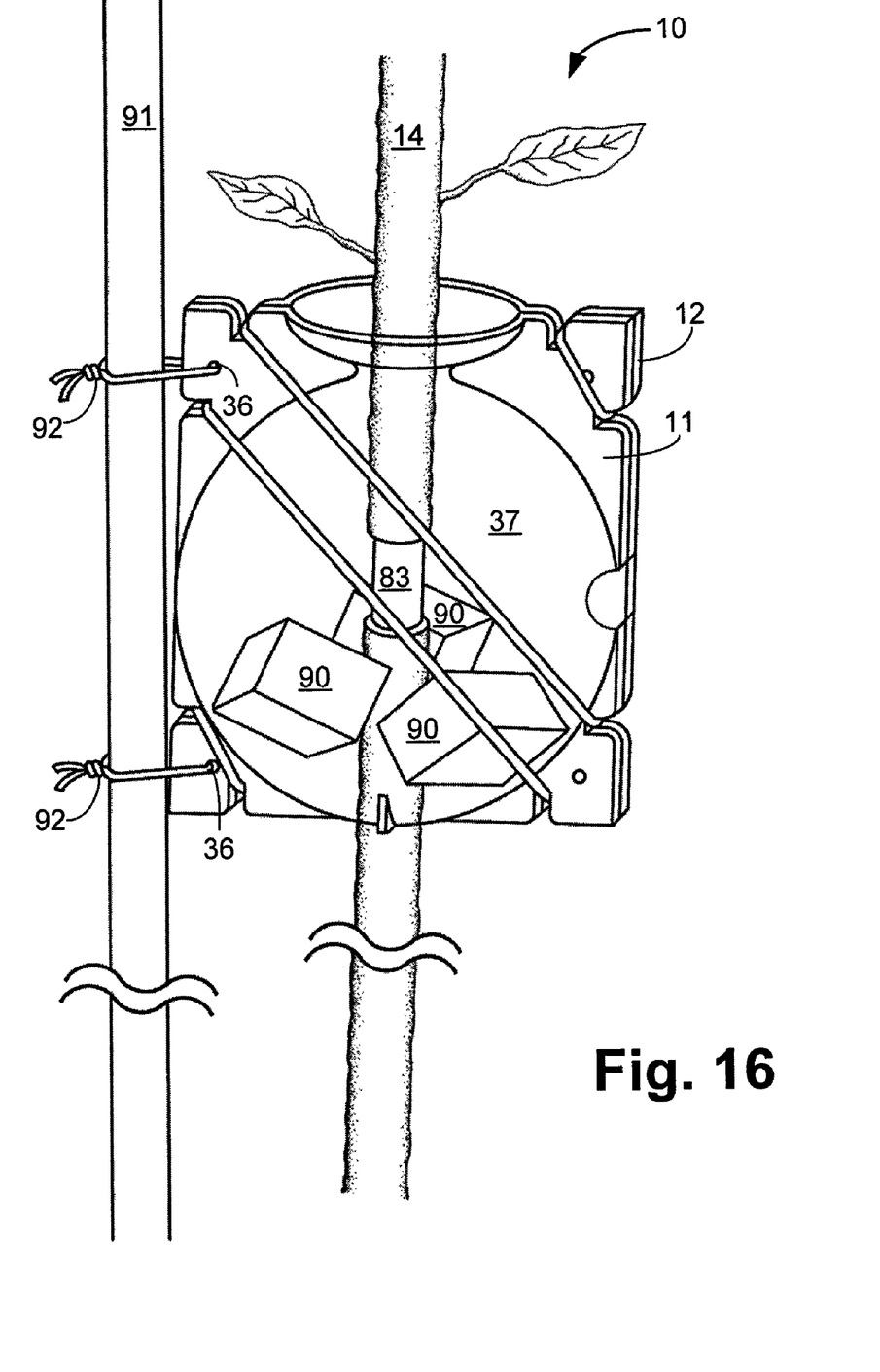
FIG. 16 is a front perspective view of the air rooting shell of FIG. 1 in which the shell is secured to a stake.

FIG. 16 depicts an embodiment of an air rooting shell 10 in which the first and second shell halves 11 and 12 are transparent. In this embodiment, blocks 90 of expandable planting medium are installed within the reservoir 37 around the branch 14. The blocks 90 expand and fill the reservoir 37 after water (not shown) is applied to the blocks 90.

A stake 91 supports the shell 10 in this embodiment. A plurality of fasteners 92, common twist ties in this embodiment, are passed through the support holes 36 and fastened to the stake 91. Other types of fasteners and fastening methods may be used to support the shell 10, if support is desired by the user (not shown).

The embodiments described herein contemplate two separate shell halves 11 and 12 that form the air rooting shell 10. However, the shell halves 11 and 12 may be integrally formed as one piece without departing from the scope of the present disclosure. For example, the shell halves 11 and 12 may be molded from one sheet of material (not shown) with a folding hinge (not shown) whereby the shell halves 11 and 12 fold together to join around the branch 14.

As described above and shown in the associated drawings, the present invention comprises an air rooting shell. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. An apparatus comprising:
a first shell half mateable with a second shell half to form a shell,
the shell comprising
a reservoir and
a top edge with an upper lipped opening for receiving a branch, the upper lipped opening comprising a flared lip for receiving water and a narrowed neck opening for enclosing around a branch,
wherein the first shell half and the second shell half each comprise a generally concave shell wall; and
a bottom opening generally aligned with the upper lipped opening;
wherein the bottom opening comprises a plurality of flexible petals.

2. An apparatus comprising:
a first shell half mateable with a second shell half to form a shell,
the shell comprising
a reservoir and
a top edge with an upper lipped opening for receiving a branch, the upper lipped opening comprising a flared lip for receiving water and a narrowed neck opening for enclosing around a branch,
wherein the first shell half and the second shell half each comprise a generally concave shell wall; and
wherein the shell further comprises a plurality of side openings.

3. The apparatus of claim 2, wherein the side openings are disposed generally mid-way down the shell walls.

4. The apparatus of claim 3, wherein each of the plurality of side openings comprises a plurality of semi-circular knockout tabs disposed on each of the shell halves.

5. An apparatus comprising:
a first shell half mateable with a second shell half to form a shell,
the shell comprising
a reservoir and
a top edge with an upper lipped opening for receiving a branch, the upper lipped opening comprising a flared lip for receiving water and a narrowed neck opening for enclosing around a branch,
wherein the first shell half and the second shell half each comprise a generally concave shell wall; and
wherein the first shell half and the second shell half each comprise a flat side edge with four corner flanges disposed in a plane, and wherein the four corner flanges of the first shell half contact the four corner flanges of the second shell half, and wherein the four corner flanges of the first and second shell halves comprise grooves for receiving one or more fasteners which join the shell halves together.

6. An apparatus comprising:
two semi-spherical arts to form a sphere,
means for removably securing the two parts together,
a lipped opening at an upper side of the sphere,
a bottom opening aligned with the lipped opening; and
two side openings located at mid-points on the sphere.

7. An apparatus, comprising:
a shell having a first opening and a second opening opposing the first opening for receiving a branch;
a lip integrally formed with the shell, the lip having a periphery and a wall that progressively narrows to the first opening in the shell;
wherein the shell further comprises a third opening and a fourth opening opposing the third opening, such that the branch can extend through the third opening and the fourth opening and be perpendicular to an axis extending from the first opening.

8. The apparatus of claim 7, wherein the third opening and the fourth opening are perforated semi-circular tabs that when removed receive the branch.

9. The apparatus of claim 7, wherein the first opening and the second opening are at right angles with the third opening and the fourth opening.

10. An apparatus, comprising:
- a shell having a first opening and a second opening opposing the first opening for receiving a branch;
- a lip integrally formed with the shell, the lip having a periphery and a wall that progressively narrows to the first opening in the shell;
- wherein the shell comprises a first half shell and a second half shell;
- wherein the first half shell and the second half shell comprise one or more flanges adjacently positioned when the first half shell and the second half shell are aligned;
- wherein each of the one or more flanges comprises one or more grooves that align when the first half shell and the second half shell are aligned; and
- wherein the one or more grooves receives a fastener for coupling the first half shell to the second half shell.

11. The apparatus of claim 10, wherein the fastener is a rubber band.

* * * * *